United States Patent [19]
Dokyi

[11] Patent Number: 5,750,982
[45] Date of Patent: May 12, 1998

[54] METHOD OF MOUNTING FILTERS ON IMAGE SENSORS

[75] Inventor: Emmanuel K. Dokyi, Rochester, N.Y.

[73] Assignee: Eastman Kodak Company, Rochester, N.Y.

[21] Appl. No.: 632,970

[22] Filed: Apr. 16, 1996

[51] Int. Cl.[6] .................................................. G01J 3/50
[52] U.S. Cl. ................... 250/226; 250/208.1; 257/432; 437/3
[58] Field of Search ............................ 250/208.1, 226; 257/432; 430/321; 437/3, 209, 211

[56] References Cited

U.S. PATENT DOCUMENTS

| | | | |
|---|---|---|---|
| 4,388,525 | 6/1983 | Phy | 257/432 |
| 5,229,595 | 7/1993 | Mikkelsen, Jr. et al. | 250/208.1 |
| 5,300,767 | 4/1994 | Steinle et al. | 250/208.1 |

Primary Examiner—Edward P. Westin
Assistant Examiner—Kevin Pyo
Attorney, Agent, or Firm—James D. Leimbach

[57] ABSTRACT

An image sensor sandwich having a linear sensor and a color filter is created that has the spacing between the sensor and the filter controlled to a very high tolerance by controlling the diameter of the glass beads within a mixture that is placed between the filter and the sensor. The mixture provides a simple, quick and economical spacing device that can be cured with few tools and requiring little time. The method and apparatus of mounting filters on sensors, comprises: providing upon select predetermined areas of a sensor a mixture of an ultraviolet curable resin and glass beads, the glass beads having an essentially uniform diameter, and further providing a light filter upon the sensor and the mixture such that the filter remains at a fixed height above the sensor, the fixed height being determined by the essentially uniform diameters of the glass beads; providing an ultraviolet light; and curing the mixture between the sensor and the filter with the ultra violet light.

17 Claims, 1 Drawing Sheet

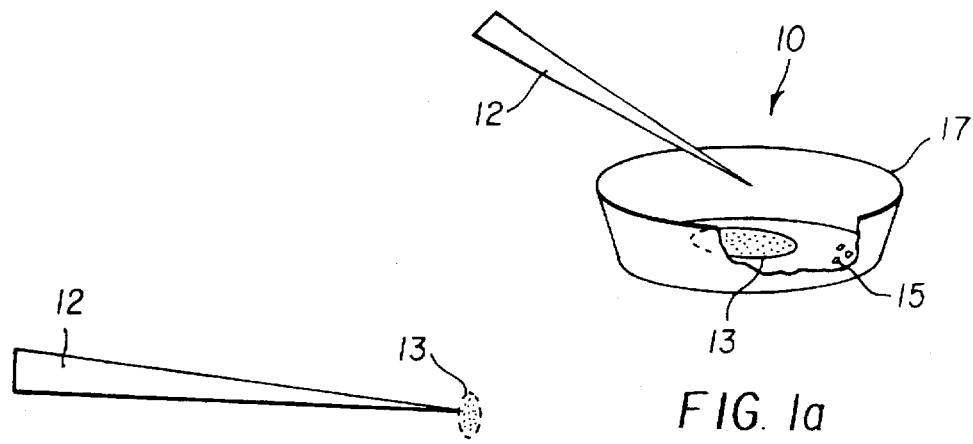
FIG. 1b
FIG. 1a
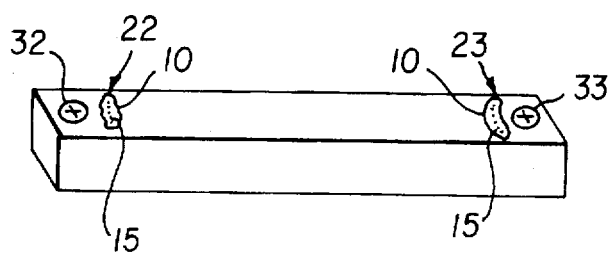
FIG. 2a
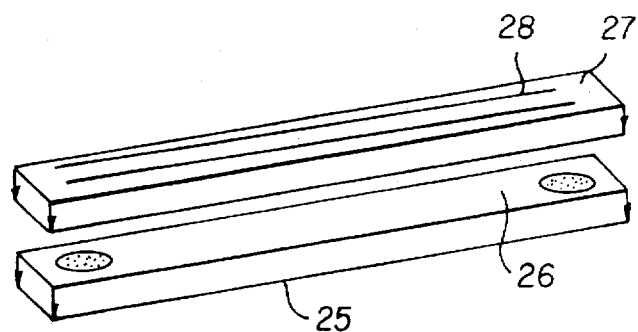
FIG. 2b
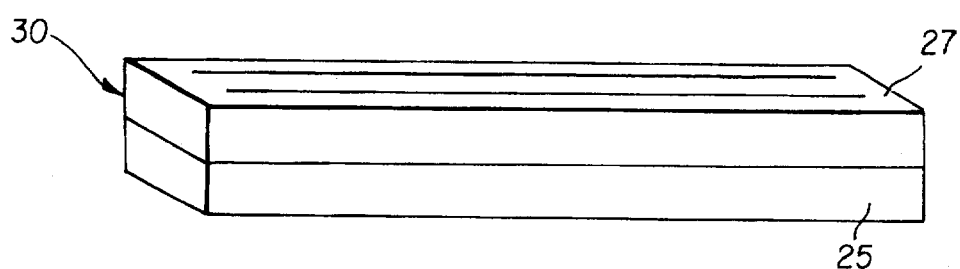
FIG. 3

METHOD OF MOUNTING FILTERS ON IMAGE SENSORS

FIELD OF INVENTION

The invention relates generally to the field of image sensors, and more specifically, the invention relates to mounting filters to image sensors.

BACKGROUND OF THE INVENTION

There are numerous prior art references that detail methods for the mounting of various semiconductor components in a desirable manner. The prior art references typically detail methods and apparatus that employ epoxy type resins. Other prior art devices employ spherical beads as spacers. However, a problem exists in having the devices and methods providing a means to accurately space parts of these semiconductors to a high degree of accuracy. The prior art methods results in inefficient procedures that require too much time and expensive equipment. These references have not provided techniques that resolve the economic and manufacturing problems that are associated with the mounting of filters used with image sensors that require high tolerance spacing.

SUMMARY OF THE INVENTION

The present invention solves the above related problems, and others, in the prior art by creating a sandwich with a linear image sensor and a color filter that have spacing between them controlled to a very high tolerance by controlling the diameter of glass beads within the mixture applied between the sensor and the filter. The mixture provides a simple, quick and economical spacing device that can be cured in very short time periods by employing an ultraviolet sensitive epoxy and requires few tools and little time.

The method and apparatus for mounting the filter upon the sensor, comprises:

a) providing upon select predetermined areas of a sensor a mixture of an ultraviolet curable resin and glass beads, the glass beads having an essentially uniform diameter, and future providing a light filter upon the sensor and the mixture such that the filter remains at a fixed height above the sensor, the fixed height being determined by the essentially uniform diameters of the glass beads;

b) providing an ultraviolet light; and c) curing the mixture between the sensor and the filter with the ultra violet light.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention provides a method and apparatus that can accurately space filters used with image sensors:
 that requires less time;
 spaces filters accurately; and
 requires few tools to implement.

BRIEF DESCRIPTION OF THE DRAWINGS

FIG. 1a is an illustration of the mixing of the glass beads and resin;

FIG. 1b is an illustration of the method used to pick up the glass bead mixture;

FIG. 2a illustrates the placing of a mixture of glass beads and epoxy on an image sensor;

FIG. 2b illustrates the placing of a filter on the image sensor such that the spacing is controlled by the size of the beads; and FIG. 3 shows the final image sensor device sandwich after curing;

To facilitate understanding, identical reference numerals have been used, where possible, to designate identical elements that are common to the figures.

DETAILED DESCRIPTION OF THE INVENTION

It has been discovered that highly accurate spacing in the mounting of color filters used in image sensors can be achieved in a timely and economical manner. The present invention describes a method of mounting dichroic filters on linear sensors, and the apparatus required to accomplish this method.

Referring to FIG. 1 in conjunction with FIG. 2, the mixture of glass beads 15 and UV resin 13 is mixed in dish 17. The mixture, generally referred to as 10, is then used to form a spacing material between a sensor and a color filter that requires a specific gap in relation to the sensor. Then by contacting the UV resin 13 adhesive with a plurality of glass beads 15 to form a mixture 10 that will allow the UV resin 13 adhesive to encapsulate the beads 15 but without allowing the beads 15 to flow freely within the mixture 10, it has been found that the spacing between the sensor and the filter can be accurately controlled.

Referring to FIGS. 2a and 2b the method envisioned by the present invention comprises the steps of providing an adhesive on the end of a pin vise 12 as shown in FIG. 1, which is an illustration of the preferred method used to pick up a glass bead 15, and bringing the pin vise 12 into contact with the mixture 10 to pick up the glass beads 15 that are covered in the UV resin 13 to form a viscous mixture 10. The beads 15 are brought into contact, along with the mixture 10, with selected regions 22, 23, of an image sensor 20. The image sensor 20 as illustrated by the preferred embodiment is a linear sensor. By placing the mixture 10 of glass beads 15 and UV curable resin 13 on the appropriate select regions 22, 23 of image sensor 25, the sensing elements 26 on sensor 25 will have consistent focal distances in relation to the color filter elements 28 of filter 27. The filter 27 used within the preferred embodiment is a dichroic filter which requires a fixed spacing distance in relation to the linear sensor 25. This spacing requires a high degree of tolerance. The sandwich 30 is then formed by placing the filter 27 upon sensor 25 aligning the filter 27 in accordance with alignment marks 32, 33. It should be understood to those skilled in the art that the selected region 22, 23 upon which mixture 10 is placed will not cover either the alignment marks 32, 33 or the sensing elements 26 of sensor 25.

By employing mixture 10 having glass beads 15 with identical diameters, it is envisioned that automated processes can be developed to complete the assembly of the image sensor with its corresponding color filter. Automating the mounting process is desirable because of the volume that can be produced by automation.

In either automated or more of a manual process, the final step is to cure the adhesive resin. An ultraviolet light source 40 is then used to cure the adhesive 13 within mixture 10 as placed in select region 22, 23. This will hold the filter 27 in placed of the silicon sensor 25. The height of the dichroic filter 27 above the silicon sensor 25 is determined by the diameter of beads 15 within mixture 10. The diameter of glass beads 15 can be one of several sizes, either 12 microns, 25 microns etc., depending on the focal length of the dichroic filter 27 used in conjunction with sensor 25. A typical UV curable resin 13 would be epoxy silicon acrylic.

The present invention envisions mixing an ultraviolet (UV) curable resin with glass beads. Norland 83H ultraviolet curable epoxy is the preferred resin envisioned by the inventor. This epoxy is preferred because its only partially UV curable. This allows a non-ultraviolet resin to be employed with the UV resin. A main reason for applying both UV and non-UV resins together is due to the yellowing characteristics of the UV type resins, the photosensitive areas are then covered with a non-UV resin. The UV resin is essentially used to provide spacing with the glass beads and for quick set up time. Norland 81H is also a desirable epoxy, however, it is completely UV curable and therefore does not bond as well with a non-UV resin. A non-UV resin that is preferred is the Dow Corning 93-500. It is also envisioned that spacers other than glass beads are usable, and that these are believed to be obvious variations of the preferred embodiment. Latex beads would be an alternative, especially if using a completely UV curable resin such as the Norland 81H. Cut silicon, or cut glass would also be usable alternatives but are less desirable than spherical elements such as beads.

The invention has been described with reference to a preferred embodiment. However, it will be appreciated that variations and modifications can be effected by a person of ordinary skill in the art without departing from the scope of the invention.

Parts List:
10 mixture
12 pin vise
13 adhesive
15 glass beads
17 dish
22 selected region
23 selected region
25 image sensor
26 image sensing elements
27 filter
28 filter slits
30 sensor sandwich
32 alignment mark
33 alignment mark

I claim:

1. A method of mounting filters on sensors, comprising the steps of:

a) providing upon select predetermined areas of a sensor a mixture of an ultraviolet curable resin and spacer elements the spacer elements, formed as a plurality of glass beads, having an essentially uniform dimension among them, and further providing a light filter upon the sensor and the mixture such that the filter remains at a fixed height above the sensor, the fixed height being determined by the essentially uniform diameters of the glass beads;

b) providing an ultraviolet light; and c) curing the mixture between the sensor and the filter with the ultraviolet light.

2. The method of claim 1 wherein the filter is a dichroic filter.

3. The method of claim 1 wherein the sensor is a linear sensor.

4. The method of claim 1 wherein the spacer elements are spherical beads.

5. The method of claim 1 further comprising an additional providing step after the curing step of providing a non-ultraviolet resin over photosensitive elements.

6. The method of claim 5 wherein the providing step further comprises bringing the mixture into contact with selected regions.

7. An image sensing device sandwich comprising:
   an image sensor;
   a light filter; and
   a plurality of spherical beads functioning having uniform diameters resting within a mixture comprising curable resin that has been cured sandwiched between the image sensor and the light filter.

8. The device of claim 7 wherein the curable resin is an ultraviolet curable resin.

9. The device of claim 8 wherein the mixture is placed at preselected locations between the sensor and the filter.

10. The device of claim 7 wherein the filter is a dichroic filter.

11. The device of claim 7 wherein the image sensor is a linear image sensor.

12. A method of mounting a dichroic filter on a linear image sensor, comprising the steps of:

a) placing an adhesive on the end of a pin vise;

b) contacting the adhesive with a plurality of spherical beads to form a mixture such that the adhesive encapsulates the beads but the beads do not flow from the mixture;

c) bringing the mixture into contact with the selected regions on the linear image sensor;

d) aligning the dichroic filter with the linear image sensor; and e) curing the adhesive such that a permanent sandwich is formed.

13. The method of claim 12 wherein the step of contacting with an adhesive further comprises contacting with an ultraviolet curable resin.

14. The method of claim 13 wherein the step of curing further comprises applying ultraviolet radiation to cure the resin.

15. The method of claim 12 wherein the step of contacting the adhesive with a plurality of spherical beads further comprises the spherical beads that are of essentially identical diameters.

16. The method of claim 12 wherein the spherical beads are selected from either glass or latex.

17. The method of claim 12 further comprising the step of providing after the curing step another providing step that provides a non-ultraviolet curable resin over photosensitive elements.

* * * * *